United States Patent
Li et al.

(10) Patent No.: US 11,287,440 B2
(45) Date of Patent: Mar. 29, 2022

(54) ACCELERATION SENSING STRUCTURE AND ACCELEROMETER

(71) Applicant: NATIONAL TSING HUA UNIVERSITY, Hsinchu (TW)

(72) Inventors: Sheng-Shian Li, Taoyuan (TW); Ranjith Hosur Ganesh, Hsinchu (TW); Gayathri Pillai, Hsinchu (TW); Chien-Hao Weng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/920,383

(22) Filed: Jul. 2, 2020

(65) Prior Publication Data

US 2021/0263067 A1    Aug. 26, 2021

(30) Foreign Application Priority Data

Feb. 21, 2020   (TW) .................................. 109105750

(51) Int. Cl.
*G01P 15/09* (2006.01)

(52) U.S. Cl.
CPC .................................. *G01P 15/09* (2013.01)

(58) Field of Classification Search
CPC ..................................................... G01P 15/09
See application file for complete search history.

(56) References Cited

U.S. PATENT DOCUMENTS

| 6,282,956 B1 * | 9/2001 | Okada ..................... G01C 19/56 73/504.12 |
| 2010/0300205 A1 * | 12/2010 | Kazama .............. G01P 15/0802 73/514.33 |

FOREIGN PATENT DOCUMENTS

| CN | 108872634 A | 11/2018 |
| CN | 109160484 A | 1/2019 |
| TW | 200724923 A | 7/2007 |
| TW | 200907345 A | 2/2009 |
| TW | 200914832 A | 4/2009 |

\* cited by examiner

*Primary Examiner* — Xin Y Zhong
(74) *Attorney, Agent, or Firm* — CKC & Partners Co., LLC

(57) ABSTRACT

An acceleration sensing structure includes a frame, a proof mass, a gimbal and at least two outer flexible arms. The proof mass is suspended from the frame and has a first thickness. The proof mass is surrounded by and connected to the gimbal. The gimbal has a second thickness. The at least two outer flexible arms are connected between the gimbal and the frame, and the at least two outer flexible arms are arranged symmetrically. The second thickness is larger than or equal to one-half of the first thickness and is smaller than or equal to the first thickness, and when the proof mass moves, the at least two outer flexible arms are deformed.

10 Claims, 8 Drawing Sheets

ACCELERATION SENSING STRUCTURE AND ACCELEROMETER

RELATED APPLICATIONS

This application claims priority to Taiwan Application Serial Number 109105750, filed Feb. 21, 2020, which is herein incorporated by reference.

BACKGROUND

Technical Field

The present disclosure relates to a sensing structure and a sensing device. More particularly, the present disclosure relates to an acceleration sensing structure and an accelerometer.

Description of Related Art

Piezoelectric accelerometers are popular owing to the wide dynamical range, the low output noises, the low temperature dependence, the high reliability and the high sensitivity thereof. In today's technology trend, it is important to detect weak vibrating signals, and therefore there is a need to develop accelerometers with high performance for serving as vibrating monitoring elements in the smart manufacturing filed.

The acceleration sensing structure used in conventional piezoelectric accelerometers has a single proof mass and a single arm. Although this kind of acceleration sensing structure has an advantage of high sensitivity, the structure is easily breakable by resonance. Hence, acceleration sensing structures have a plurality of proof masses and a plurality of arms are developed. The acceleration sensing structures have a capability to bear impacts with high frequency; however, the sensitivity thereof is low.

Therefore, how to effectively improve the structure arrangement of the acceleration sensing structure to improve the performance and the structure reliability thereof becomes a pursuit target for practitioners.

SUMMARY

According to one aspect of the present disclosure, an acceleration sensing structure includes a frame, a proof mass, a gimbal and at least two outer flexible arms. The proof mass is suspended from the frame and has a first thickness. The proof mass is surrounded by and connected to the gimbal. The gimbal has a second thickness. The at least two outer flexible arms are connected between the gimbal and the frame, and the at least two outer flexible arms are arranged symmetrically. The second thickness is larger than or equal to one-half of the first thickness and is smaller than or equal to the first thickness, and when the proof mass moves, the at least two outer flexible arms are deformed.

According to another aspect of the present disclosure, an acceleration sensing structure includes a frame, a proof mass, a gimbal, at least two inner flexible arms and at least two outer flexible arms. The proof mass is suspended from the frame and has a first thickness and a proof mass top. The proof mass is surrounded by the gimbal. The gimbal has a second thickness and a gimbal top. The at least two inner flexible arms are connected between the proof mass and the gimbal and are arranged symmetrically. Each of the inner flexible arms has an inner flexible arm top. The at least two outer flexible arms are connected between the gimbal and the frame and are arranged symmetrically. Each of the at least two outer flexible arms has an outer flexible arm top. The proof mass top, the gimbal top, each of the inner flexible arm tops and each of the outer flexible arm tops are aligned to each other. The second thickness is larger than or equal to one-half of the first thickness and is smaller than or equal to the first thickness, and when the proof mass moves, the at least two inner flexible arms and the at least two outer flexible arms are deformed.

According to yet another aspect of the present disclosure, an accelerometer includes a bottom cover, an acceleration sensing structure and a top cover. The acceleration sensing structure is disposed on the bottom cover, and the top cover is located above the acceleration sensing structure.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as be "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
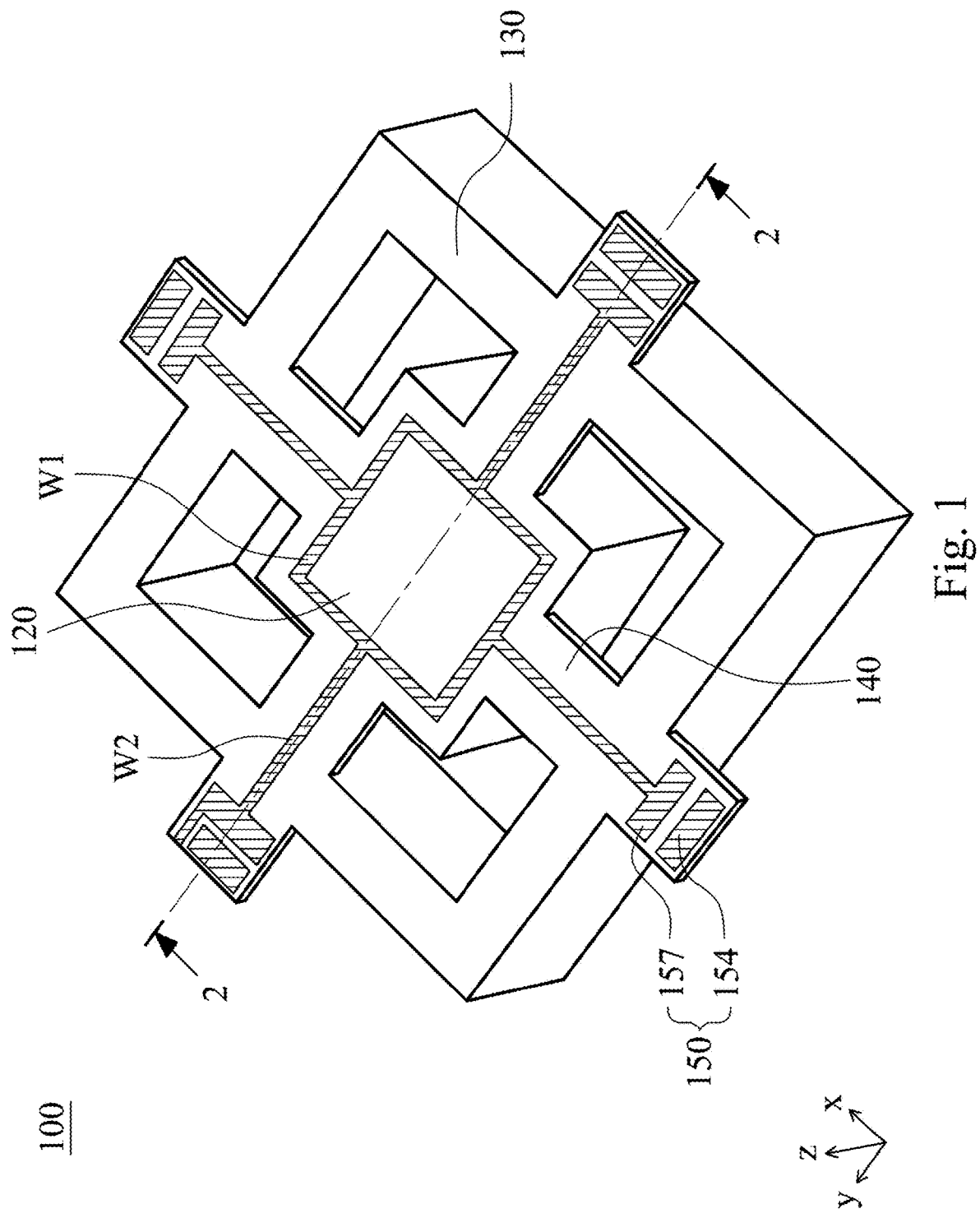
FIG. 1 is a three dimensional schematic view showing an acceleration sensing structure according to a first embodiment of the present disclosure.
Figure 2:
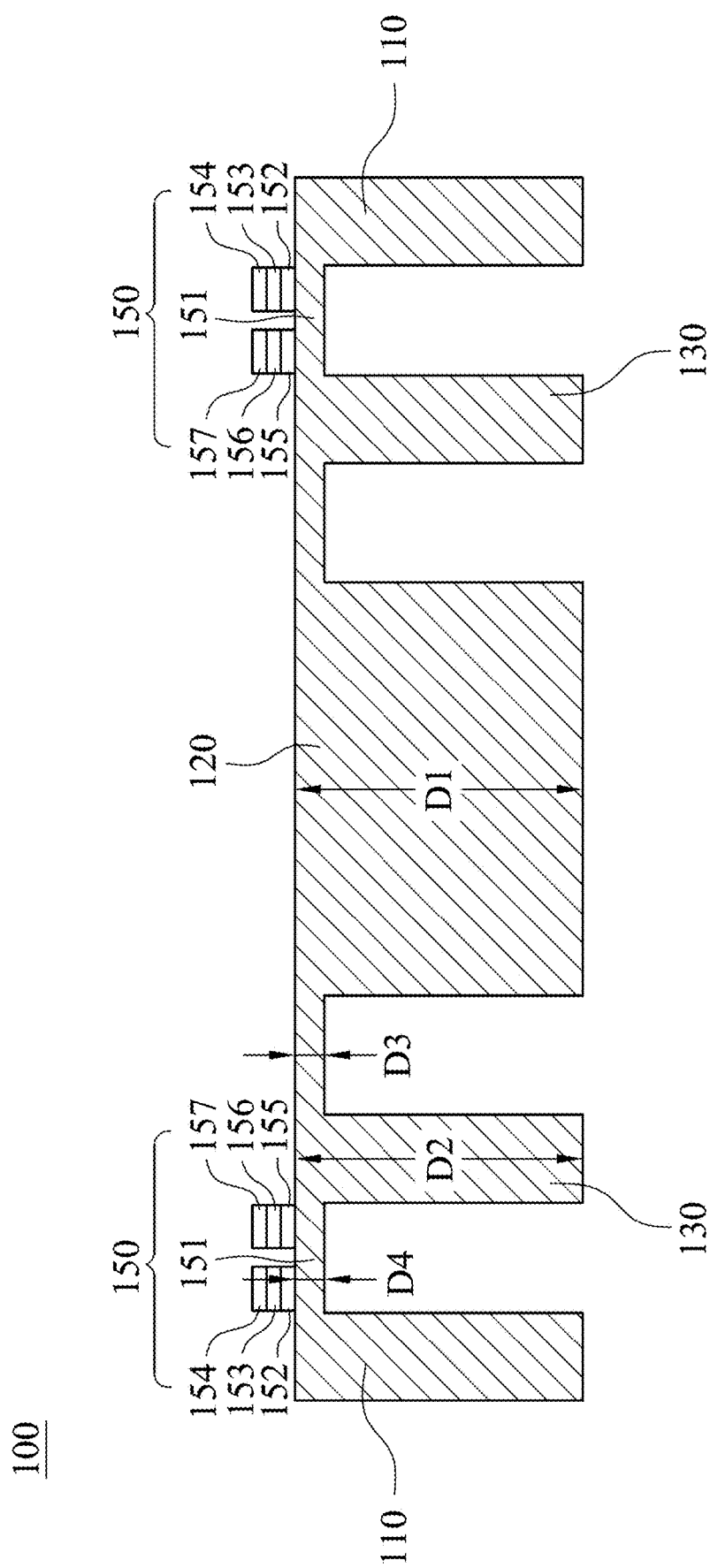
FIG. 2 is a cross-sectional view showing the acceleration sensing structure of the first embodiment taken along line 2-2.

FIG. 1 is a three dimensional schematic view showing an acceleration sensing structure 100 according to a first embodiment of the present disclosure. FIG. 2 is a cross-sectional view showing the acceleration sensing structure 100 of the first embodiment taken along line 2-2. Please be noted that, in order to clarify the drawings, a frame 110 is omitted in FIG. 1, and wires W1 and W2 and some layers are omitted in FIG. 2, but the present disclosure is not limited thereto. The acceleration sensing structure 100 includes the frame 110, a proof mass 120, a gimbal 130 and at least two outer flexible arms 150.

The proof mass 120 is suspended from the frame 110 and has a first thickness D1. The proof mass 120 is surrounded by and connected to the gimbal 130. The gimbal 130 has a second thickness D2. The at least two outer flexible arms 150 are connected between the gimbal 130 and the frame 110, and the at least two outer flexible arms 150 are arranged symmetrically. The second thickness D2 is larger than or equal to one-half of the first thickness D1 and is smaller than or equal to the first thickness D1, and when the proof mass 120 moves, the at least two outer flexible arms 150 are deformed.

Therefore, through the configuration of the gimbal 130 and the relationship between the second thickness D2 thereof and the first thickness D1 of the proof mass 120, the performance of the acceleration sensing structure 100 can be improved; additionally, the acceleration sensing structure 100 has high structural stability. The details of the acceleration sensing structure 100 will be described hereafter.

In the first embodiment, the acceleration sensing structure 100 can further include at least two inner flexible arms 140 connected between the proof mass 120 and the gimbal 130, and the at least two inner flexible arms 140 are arranged symmetrically. When the proof mass 120 moves, the at least two inner flexible arms 140 are deformed. As shown in FIG. 1, a number of the at least two outer flexible arms 150 is four, and the four outer flexible arms 150 are arranged symmetrically. A number of the at least two inner flexible arms 140 are also four, and each of the four inner flexible arms 140 corresponds to each of the four outer flexible arms 150.

The first thickness D1 of the proof mass 120 can be equal to the second thickness D2 of the gimbal 130. The proof mass 120 has a rectangular prism structure and therefore has four sides and four outer corners. The gimbal 130 has a rectangular frame structure and therefore has four sides and four inner corners. The inner flexible arms 140 each is connected between each center point of each side of the proof mass 120 and each center point of each side of the gimbal 130, and the center point indicates the middle point of the side. Each of the outer flexible arms 150 is connected between each center point of each side of the gimbal 130 and each center point of each side of the frame 110. Two of the inner flexible arms 140 and two of the outer flexible arms 150 are arranged alone an X-axis, and the other two of the inner flexible arms 140 and the other two of the outer flexible arms 150 are arranged alone a Y-axis. In addition, the proof mass 120 can have a proof mass top (not labeled). The gimbal 130 can have a gimbal top (not labeled). Each of the inner flexible arms 140 can have an inner flexible arm top (not labeled). Each of the outer flexible arms 150 can have an outer flexible arm top (not labeled). The proof mass top, the gimbal top, each of the inner flexible arm tops and each of the outer flexible arm tops are aligned to each other.

As being a piezoelectric sensor, the acceleration sensing structure 100 of the first embodiment includes a first piezoelectric layer 156 adjacent to the gimbal 130 and a second piezoelectric layer 153 spaced apart from the first piezoelectric layer 156 and adjacent to the frame 110. As shown in FIG. 2, the acceleration sensing structure 100 can further include a substrate 151, a first bottom electrode 155, a first upper electrode 157, a second bottom electrode 152 and a second upper electrode 154. The first bottom electrode 155 is disposed on the substrate 151 and is adjacent to the gimbal 130. The first piezoelectric layer 156 is disposed on the first bottom electrode 155. The first upper electrode 157 is disposed on the first piezoelectric layer 156. The second bottom electrode 152 is spaced apart from the first bottom electrode 155 and is disposed on the substrate 151. The second bottom electrode 152 is adjacent to the frame 110. The second piezoelectric layer 153 is disposed on the second bottom electrode 152. The second upper electrode 154 is disposed on the second piezoelectric layer 153.

Hence, when the proof mass 120 senses the acceleration and therefore moves, each of the inner flexible arms 140 and each of the outer flexible arms 150 are deformed. As a result, the first piezoelectric layer 156 and the second piezoelectric layer 153 produce voltages owing to the deformation thereof, and the voltages can be read via the first upper electrode 157 and the second upper electrode 154. By analyzing the voltages read form the first upper electrode 157 and the second upper electrode 154, the value of the acceleration sensed by the proof mass 120 can be obtained. In the first embodiment, each of the inner flexible arms 140 has a third thickness D3, and each of the outer flexible arms 150 has a fourth thickness D4. Each of the third thickness D3 is smaller than the second thickness D2, and each of the fourth thickness D4 is smaller than the second thickness D2. In such structure, when the proof mass 120 senses the acceleration and therefore moves, the inner flexible arms 140 and the outer flexible arms 150 will be deformed owing to the low rigidity thereof, and then the first piezoelectric layer 156 and the second piezoelectric layer 153 are deformed to generate voltages.

During fabrication, the acceleration sensing structure 100 can be formed by a silicon on insulator wafer which is processed by coating, exposure, development, and etching. Consequently, the substrates of the proof mass 120, the gimbal 130 and the inner flexible arms 140 are made of single-crystal silicon and are integrally formed.

In addition, the acceleration sensing structure 100 can further include wires W1 and W2. The wire W1 is located on the proof mass 120 and is electrically connected to the wire W2. The wire W2 is located at the inner flexible arms 140 and electrically connected to each of the first upper electrodes 157. The wire W2 can further extend to the frame 110 for later circuit configuration. The circuit configuration can be changed by demands, and will not be limited thereto. In one embodiment, the wires, the first upper electrode and the second upper electrode are formed by the same metal layer which is processed by exposure, development, and etching according to a circuit pattern.

Figure 3:
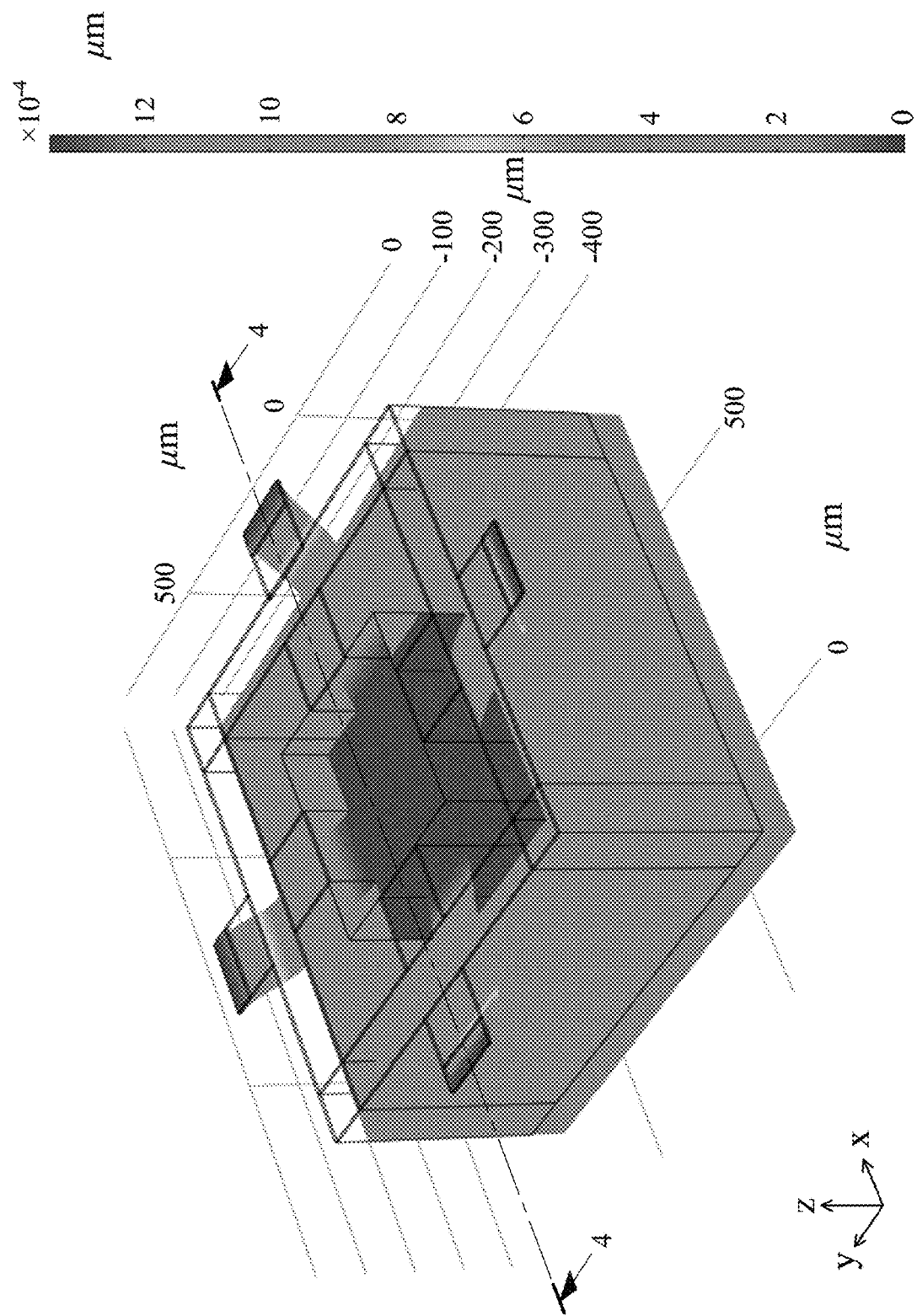
FIG. 3 is a simulation result showing a Z-axis displacement of the acceleration sensing structure of the first embodiment.
Figure 4:
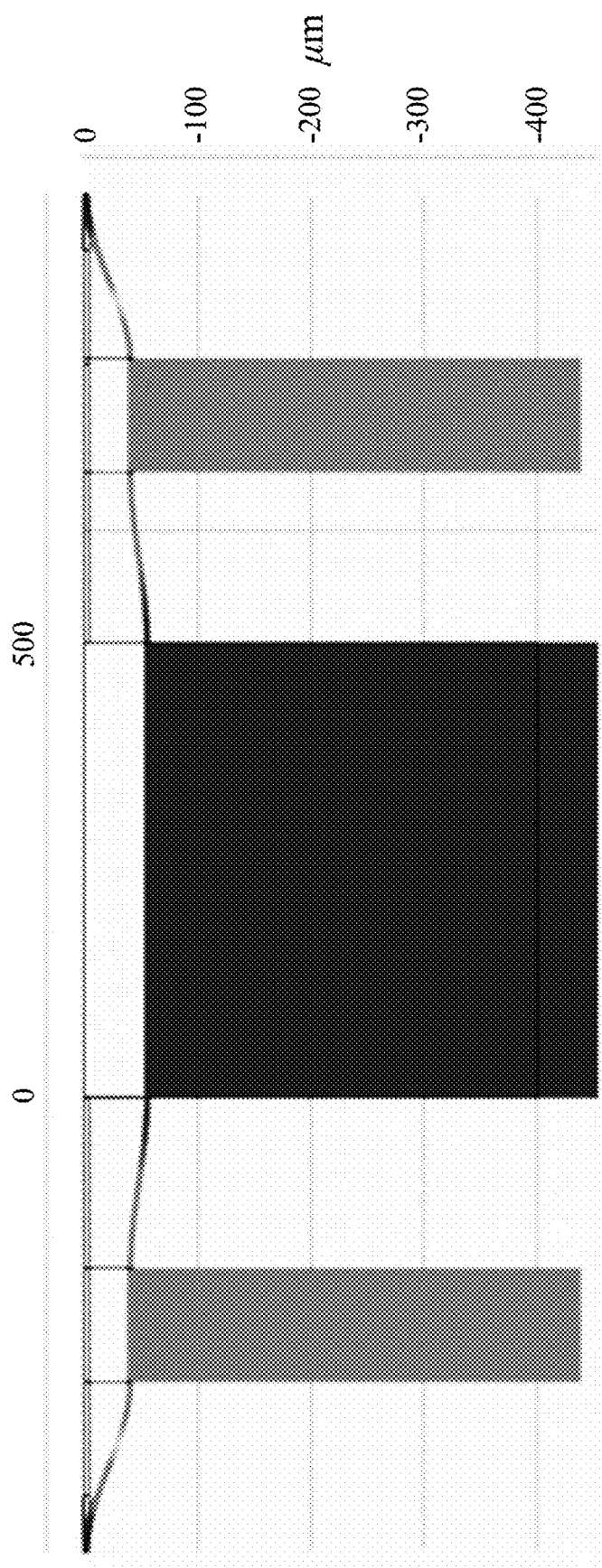
FIG. 4 is a simulation result showing a cross-sectional view of the Z-axis displacement of the acceleration sensing structure of the first embodiment.
Figure 5:
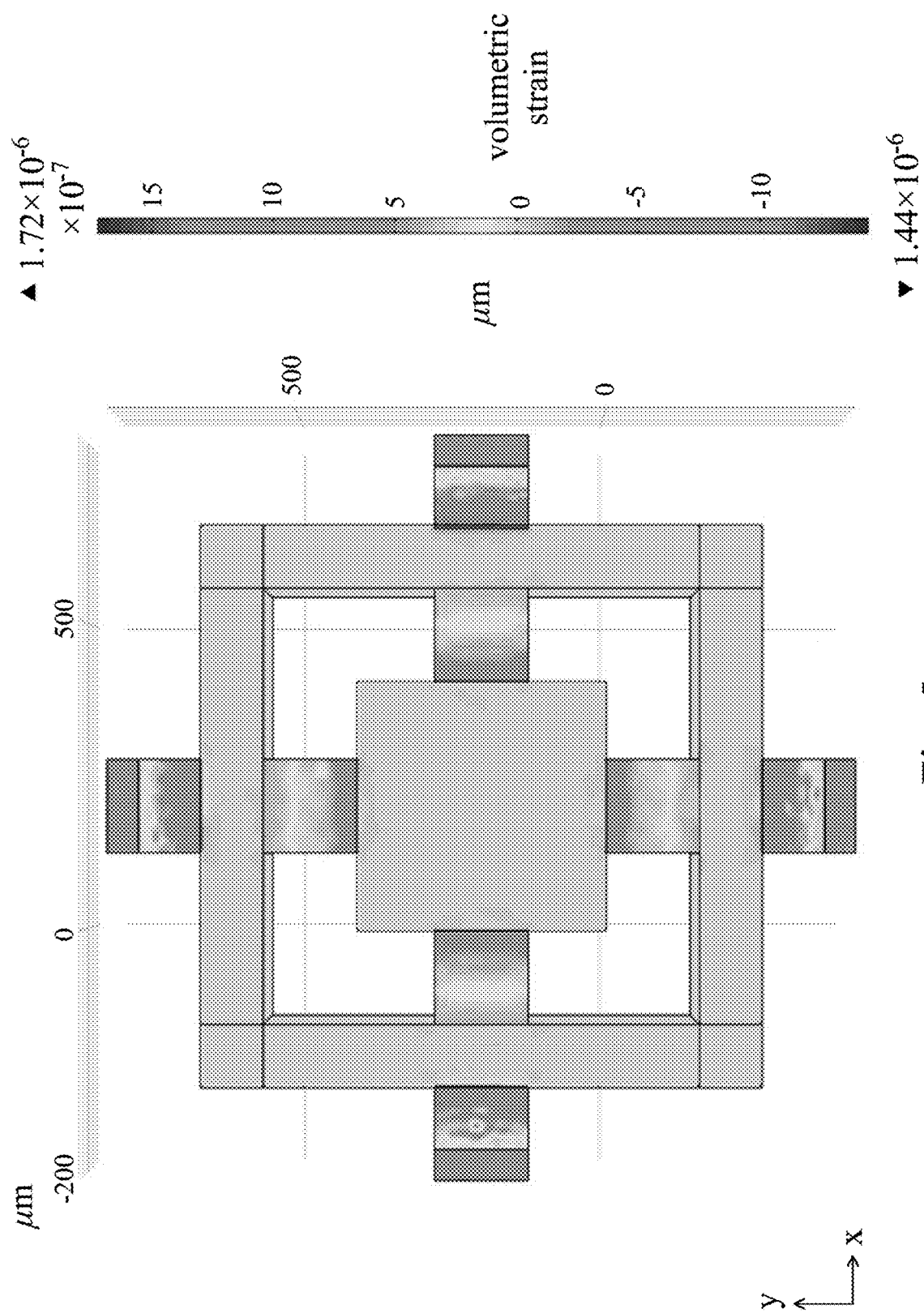
FIG. 5 is a simulation result showing the volumetric strain of the acceleration sensing structure of the first embodiment.

FIG. 3 is a simulation result showing a Z-axis displacement of the acceleration sensing structure 100 of the first embodiment. FIG. 4 is a simulation result showing a cross-sectional view of the Z-axis displacement of the acceleration sensing structure 100 of the first embodiment. FIG. 5 is a simulation result showing the volumetric strain of the acceleration sensing structure 100 of the first embodiment. In FIGS. 3, 4 and 5, when the acceleration sensing structure 100 senses the acceleration in the Z-axis, the proof mass 120 will move, and meanwhile, the inner flexible arms 140 and the outer flexible arms 150 are deformed. Since the second thickness D2 of the gimbal 130 satisfies the relation, the gimbal 130 has enough rigidity and will not are deformed.

Figure 6:
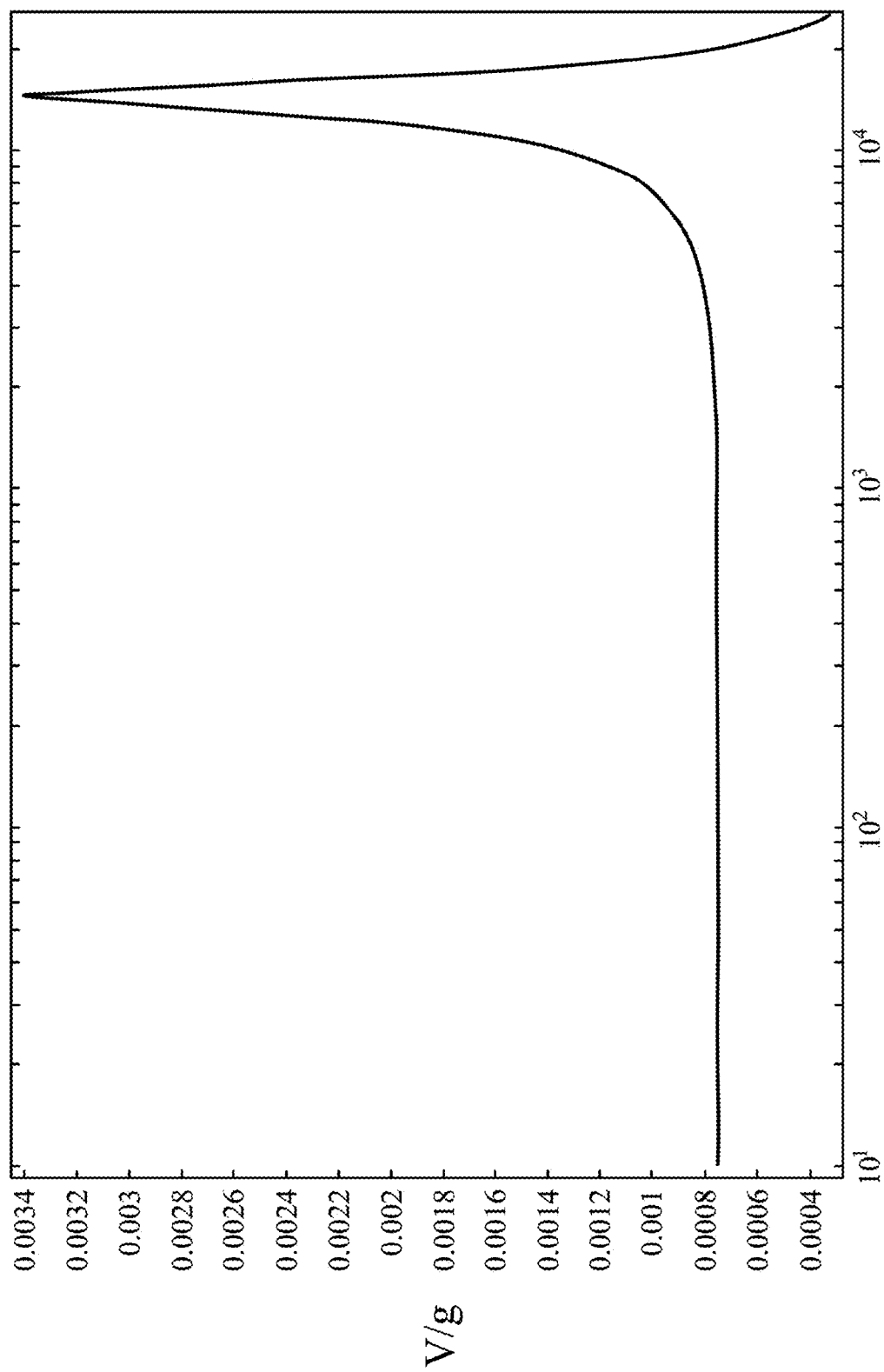
FIG. 6 is a frequency response of the acceleration sensing structure of the first embodiment.

FIG. 6 is a frequency response of the acceleration sensing structure 100 of the first embodiment. Please refer to FIG. 6 with reference of Table 1. Table 1 illustrates the sensitivities, the frequencies and the Figure of Merit (FOM) of the first embodiment, a first comparative example and a second comparative example. The acceleration sensing structure of the first comparative example includes a proof mass and four flexible arms, but the acceleration sensing structure does not include any gimbal. The acceleration sensing structure of the second comparative example includes a proof mass, a gimbal, four inner flexible arms and four outer flexible arms, but the difference between the first embodiment and the second comparative example is that the gimbal of the second comparative example is thinner and the second thickness of the gimbal is smaller than one-half of the first thickness. Consequently, the gimbal of the second comparative example will be deformed when sensing the acceleration. As illustrated in Table 1, the FOM of the acceleration sensing structure 100 is equal to 10.875, which is higher than that of the first comparative example and the second comparative example. It is proved that the acceleration sensing structure 100, which includes the gimbal 130 and satisfies the relationship that the second thickness D2 is larger than or equal to one-haft of the first thickness D1 and smaller than or equal to the first thickness D1, has good performance.

TABLE 1

|  | Sensitivity (V/g) | Frequency (Hz) | FOM |
|---|---|---|---|
| first embodiment | 0.00075 | 14450 | 10.875 |
| first comparative example | 0.00077 | 5500 | 4.235 |
| second comparative example | 0.00070 | 6000 | 4.200 |

Figure 7:
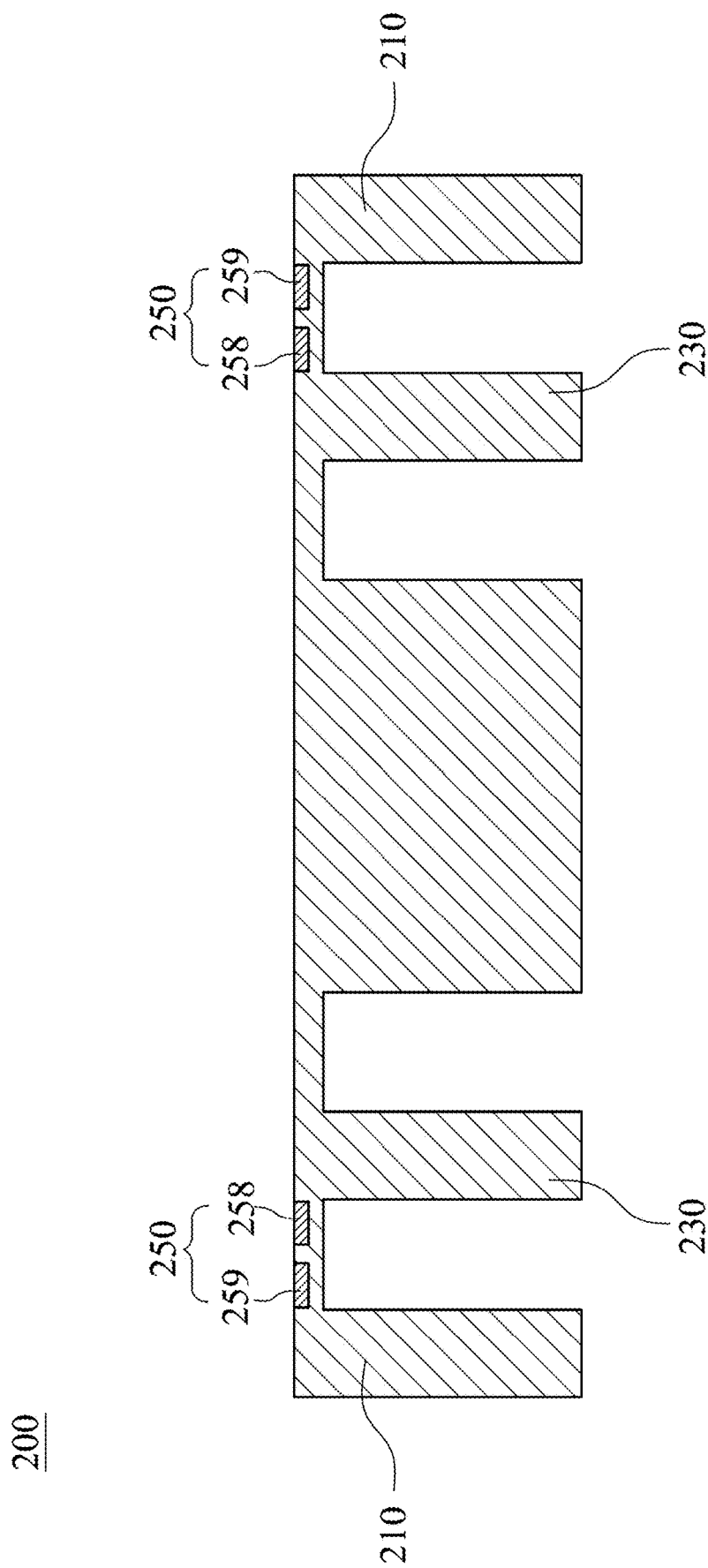
FIG. 7 is a cross-sectional view showing an acceleration sensing structure according to a second embodiment of the present disclosure.

FIG. 7 is a cross-sectional view showing an acceleration sensing structure 200 according to a second embodiment of the present disclosure. The difference between the acceleration sensing structure 200 of the second embodiment and the acceleration sensing structure 100 of the first embodiment is that the acceleration sensing structure 200 is a piezoresistive sensor. Each of the outer flexible arms 250 includes a first piezoresistive layer 258 adjacent to the gimbal 230, and a second piezoresistive layer 259 spaced apart from the first piezoresistive layer 258 and adjacent to the frame 210. The first piezoresistive layer 258 and the second piezoresistive layer 259 are made by a doping process which is conventional and will not be described in detail owing to that the process is not a key factor of the present disclosure.

Figure 8:
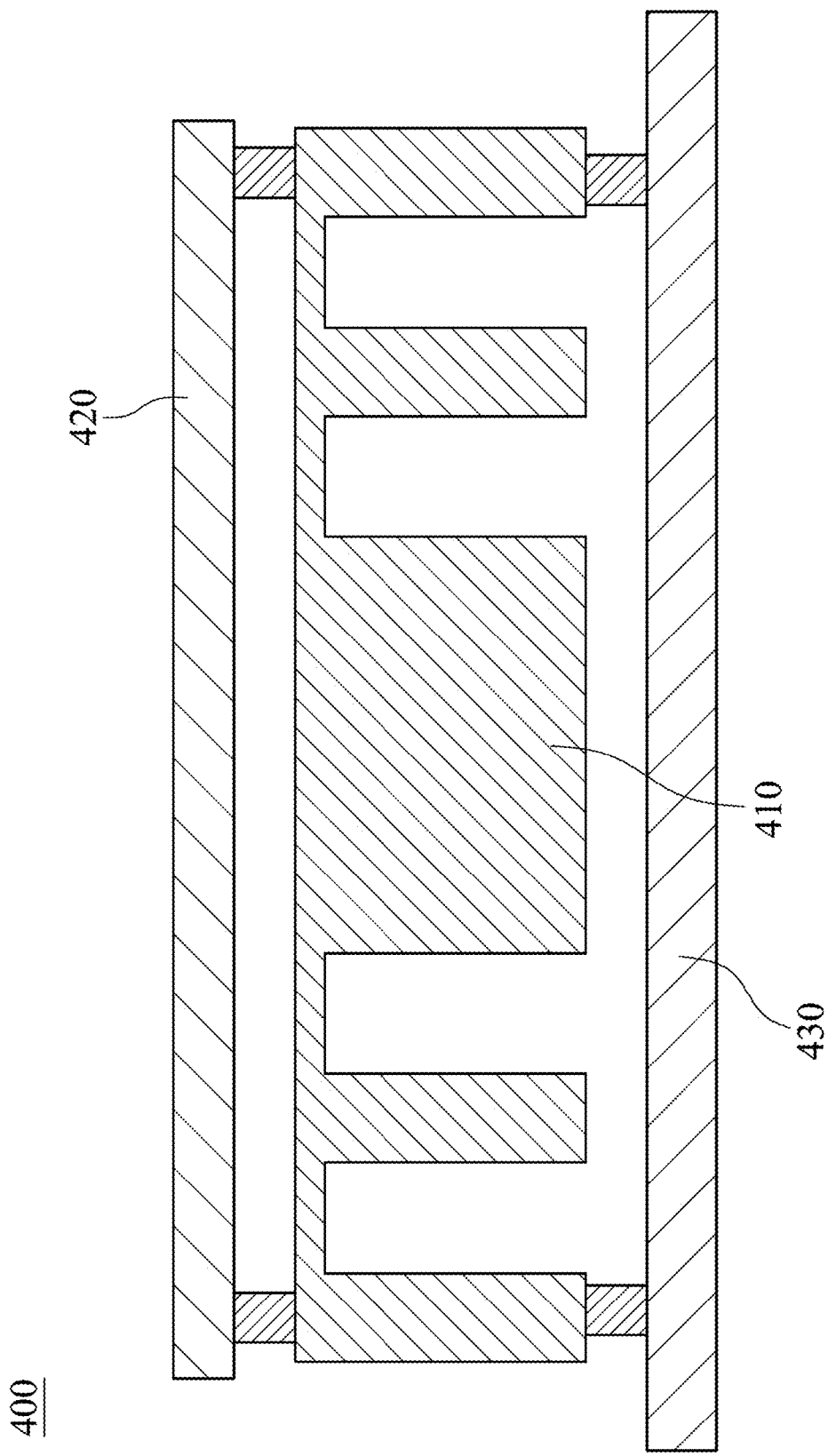
FIG. 8 is a cross-sectional view showing an accelerometer according to a third embodiment of the present disclosure.

FIG. 8 is a cross-sectional view showing an accelerometer 400 according to a third embodiment of the present disclosure. The accelerometer 400 includes a bottom cover 430, an acceleration sensing structure 410 and a top cover 420. The acceleration sensing structure 410 is disposed on the bottom cover 430, and the top cover 420 is located above the acceleration sensing structure 410. Hence, the top cover 420 and the bottom cover 430 can protect the acceleration sensing structure 410. The acceleration sensing structure 410 can be any one of the acceleration sensing structure 100 and the acceleration sensing structure 200, and the details thereof will not be described again.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. An acceleration sensing structure, comprising:
   a frame;
   a proof mass suspended from the frame and having a first thickness;
   a gimbal, wherein the proof mass is surrounded by and connected to the gimbal, and the gimbal has a second thickness;
   at least two inner flexible arms connected between the proof mass and the gimbal and being arranged symmetrically;
   at least two outer flexible arms connected between the gimbal and the frame, each of the at least two outer flexible arms aligned with each of the at least two inner flexible arms; and
   at least two deformation detectors, each of the at least two deformation detectors disposed on each of the at least two outer flexible arms without being disposed on each of the at least two inner flexible arms;
   wherein a width of each of the at least two inner flexible arms is equal to a width of each of the at least two outer flexible arms, a length of each of the at least two inner flexible arms is equal to a length of each of the at least two outer flexible arms, the second thickness is represented by D2, the first thickness is represented by D1, the condition of $0.5 \times D1 \leq D2 \leq D1$ is satisfied, and when the proof mass moves, the at least two outer flexible arms are deformed.

2. The acceleration sensing structure of claim 1, wherein each of the deformation detectors comprises:
   a first bottom electrode disposed on each of the at least two outer flexible arms and adjacent to the gimbal;
   a first piezoelectric layer disposed on the first bottom electrode;
   a first upper electrode disposed on the first piezoelectric layer;
   a second bottom electrode spaced apart from the first bottom electrode and disposed on each of the at least two outer flexible arms, the second bottom electrode adjacent to the frame;
   a second piezoelectric layer disposed on the second bottom electrode; and
   a second upper electrode disposed on the second piezoelectric layer.

3. The acceleration sensing structure of claim 1, wherein each of the deformation detectors comprises:
   a first piezoresistive layer adjacent to the gimbal; and
   a second piezoresistive layer spaced apart from the first piezoresistive layer and adjacent to the frame.

4. The acceleration sensing structure of claim 1, wherein a number of the at least two outer flexible arms is four, a number of the at least two inner flexible arms is four, and the four outer flexible arms are arranged symmetrically.

5. The acceleration sensing structure of claim 1, wherein each of the inner flexible arms has a third thickness, each of the outer flexible arms has a fourth thickness, each of the third thickness is smaller than the second thickness, and each of the fourth thickness is smaller than the second thickness.

6. An accelerometer, comprising:
   a bottom cover;
   an acceleration sensing structure of claim 1 disposed on the bottom cover; and
   a top cover located above the acceleration sensing structure.

7. An acceleration sensing structure, comprising:
   a frame;
   a proof mass suspended from the frame, the proof mass having a first thickness and a proof mass top;

a gimbal, wherein the proof mass is surrounded by the gimbal, and the gimbal has a second thickness and a gimbal top;

at least two inner flexible arms connected between the proof mass and the gimbal and being arranged symmetrically, each of the inner flexible arms having an inner flexible arm top;

at least two outer flexible arms connected between the gimbal and the frame, each of the at least two outer flexible arms aligned with each of the at least two inner flexible arms, each of the at least two outer flexible arms having an outer flexible arm top; and at least two deformation detectors, each of the at least two deformation detectors disposed on each of the at least two outer flexible arms without being disposed on each of the at least two inner flexible arms;

wherein a width of each of the at least two inner flexible arms is equal to a width of each of the at least two outer flexible arms, a length of each of the at least two inner flexible arms is equal to a length of each of the at least two outer flexible arms, the proof mass top, the gimbal top, each of the inner flexible arm tops and each of the outer flexible arm tops are aligned to each other, the second thickness is represented by D2, the first thickness is represented by D1, the condition of $0.5 \times D1 \leq D2 \leq D1$ is satisfied, and when the proof mass moves, the at least two inner flexible arms and the at least two outer flexible arms are deformed.

8. The acceleration sensing structure of claim 7, wherein each of the deformation detectors comprises:

a first piezoelectric layer adjacent to the gimbal; and a second piezoelectric layer spaced apart from the first piezoelectric layer and adjacent to the frame.

9. The acceleration sensing structure of claim 7, wherein each of the deformation detectors comprises:

a first piezoresistive layer adjacent to the gimbal; and a second piezoresistive layer spaced apart from the first piezoresistive layer and adjacent to the frame.

10. An accelerometer, comprising:

a bottom cover;

an acceleration sensing structure of claim 7 disposed on the bottom cover; and a top cover located above the acceleration sensing structure.

* * * * *